United States Patent [19]

Moriya

[11] Patent Number: 5,057,941
[45] Date of Patent: Oct. 15, 1991

[54] FACSIMILE DEVICE

[75] Inventor: Daisuke Moriya, Yamatokoriyama, Japan

[73] Assignee: Sharp Kabushiki Kaisha, Osaka, Japan

[21] Appl. No.: 534,044

[22] Filed: Jun. 6, 1990

[30] Foreign Application Priority Data

Jun. 7, 1989 [JP] Japan .................................. 1-145959

[51] Int. Cl.⁵ .............................................. H04N 1/00
[52] U.S. Cl. .................................... 358/440; 358/434; 358/435; 358/441; 379/100
[58] Field of Search ............... 358/434, 435, 441, 440; 379/100, 209

[56] References Cited

U.S. PATENT DOCUMENTS

| 4,432,020 | 2/1984 | Onose et al. | 358/434 |
| 4,646,160 | 2/1987 | Iizuka et al. | 379/355 |
| 4,741,021 | 4/1988 | Kotani et al. | 358/434 |

FOREIGN PATENT DOCUMENTS 61-230565 10/1986 Japan .

OTHER PUBLICATIONS

English language abstract of Japanese Examined Patent Publication No. 230565/1986.

Primary Examiner—Joseph A. Orsino
Assistant Examiner—Dov Popovici
Attorney, Agent, or Firm—David G. Conlin; Robert M. Asher

[57] ABSTRACT

A facsimile device having a keyboard for designating a transmitting time and a call number of a remote receiver, and a function of automatically calling a call number of a remote receiver at the designated time and receiving a reference response signal from the remote receiver when a line is connected thereto, thereafter automatically transmitting specified information to the remote receiver, which comprises a memory confirming presence or absence of a reference response signal when the line is connected to a remote receiver, for storing the call number of the remote receiver if the reference response signal from the remote receiver is absent, and a printer for outputting an alarm to inform impossibility of transmission in the case that the call number of the remote receiver designated by the keyboard corresponds with the call number stored by the memory.

7 Claims, 6 Drawing Sheets

FACSIMILE DEVICE

BACKGROUND OF THE INVENTION

1. Field of the Invention

The present invention relates to an automatic transmission type facsimile device. More specifically, the present invention relates to a time-designation and automatic-transmission type facsimile device which automatically calls the call number of a remote receiver designated in advance and automatically transmits an original set in a reading device and image information stored in a memory.

2. Description of the Related Art

An automatic transmission type facsimile device automatically calls the call number of a receiver at a remote point at a designated time and then automatically transmits information like an original set in a reading device or image information stored in the memory. If the designated call number of the remote receiver is that of a general subscriber telephone, a reference response signal cannot be received from the remote receiver when a line is connected, and a transmission is not performed. In this case, the result of contact as "no response from the remote receiver", is usually presented as a record list to the operator.

Specifically, in the conventional time-designation and automatic transmission type facsimile device, in the case where the line is connected to a general subscriber telephone and a reference response signal cannot be received since the call number of the remote receiver is erroneously designated in advance though a line is connected at a designated time, "no response from the remote receiver" is stored, and the result is printed as a communication record list just after the communication or together with results of other communications.

However, in the conventional time-designation and automatic-transmission type facsimile device, a communication record list showing whether or not a facsimile transmission was possible can be obtained at least after a time designated to transmit data, and the operator who performs a setting of a time-designation and automatic transmission has to refer to or memorize by him- or herself results of past communications to know whether or not the call number of the remote receiver to be designated is a call number to which a facsimile transmission is available. Even if the call number of the remote receiver to be designated is a call number on which an error arose in the past, the operator may make a mistake that he or she designates the same call number as the erroneous call number again without knowing it.

In other words, when the remote receiver is a general subscriber telephone, merely the result of contact is presented as stated above, and hence there is a possibility that the operator may make a mistake of designating the same call number again without knowing it.

As a related art, a data communication system is known which can call the operator of the transmitting station from the receiving station when a data communication device having an automatic dial function as the transmitting station has started automatic transmission and the receiving station tries to have a communication with the transmitting station on the basis of the automatic transmission (see Examined Japanese Patent Publication No. 230565/1986).

SUMMARY OF THE INVENTION

The present invention overcomes the above-mentioned disadvantage, and its object is to prevent a redesignation of the call number of a remote receiver which is impossible to be transmitted.

Accordingly, the present invention provides a facsimile device having designating means for designating a transmitting time of information and a call number of a remote receiver, and transmitting means for calling the call number of the remote receiver at the designated transmitting time and receiving a reference response signal from the remote receiver when a line is connected thereto, for automatically transmitting the information to the remote receiver, which comprises storing means for storing the call number of a remote receiver when the line is connected to the remote receiver but a reference response signal is not issued from the remote receiver, and warning means for outputting an alarm to inform impossibility of transmission when the call number of the remote receiver designated by the designating means is the same call number as that once stored in the storing means.

With a facsimile device structured as stated above, it is possible to inform the operator of impossibility of transmitting to a remote receiver of the call number from which a reference response signal has not been able to be received, whereby a mistake of designating the same call number again can be prevented.

BRIEF DESCRIPTION OF THE DRAWINGS

FIGS. 4 to 6(a) and 6(b) are flow charts showing operations of the embodiment.

DESCRIPTION OF THE PREFERRED EMBODIMENT

Figure 1:
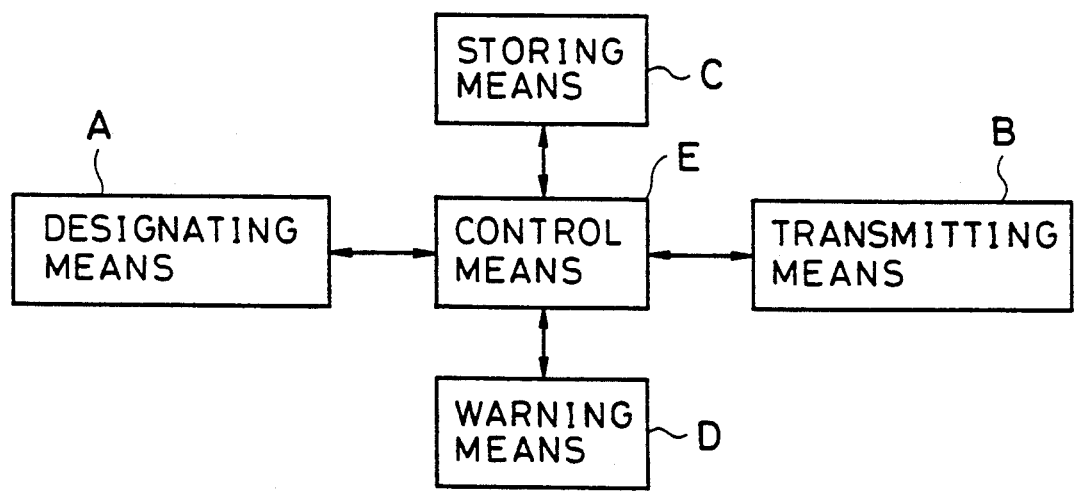
FIG. 1 is a diagram showing an architecture of the present invention.

A facsimile device according to the present invention, of which basic architecture is shown in FIG. 1, is mainly composed of designating means A, transmitting means B, storing means C, warning means D and control means E.

The above-mentioned designating means A may be that which can designate a transmission time and the call number of a facsimile receiver at a remote point; a control unit having a keyboard and the like is mainly used.

The transmitting means B may be that which can automatically call the call number of the facsimile receiver at the remote point at the designated time, receive a reference response signal (a signal of CCITT standard such as CED: Called Station Identification, NSF: Non-standard Facilities and CSI: Called Station Identification) from the facsimile receiver at the remote point when a line is connected thereto and thereafter automatically transmit specified information to the facsimile receiver at the remote point through the line; a well-known transmitting device is appropriately used.

The storing means C may be that which can store the call number of the facsimile receiver at the remote point; a internal memory like a RAM and an external memory like a floppy disc or a magnetic disc.

The warning means D may be that which can output a visible alarm to inform the operator of impossibility of transmitting when the same call number as that of the facsimile receiver from which a reference response signal has not been received is designated again; a warning lamp formed of an LCD and a printer capable of printing the information which has not been able to transmit.

The control unit E may be that which can control all the above-mentioned components; a microprocessor is used.

Then, an embodiment shown in the drawings will be described.

Figure 2:
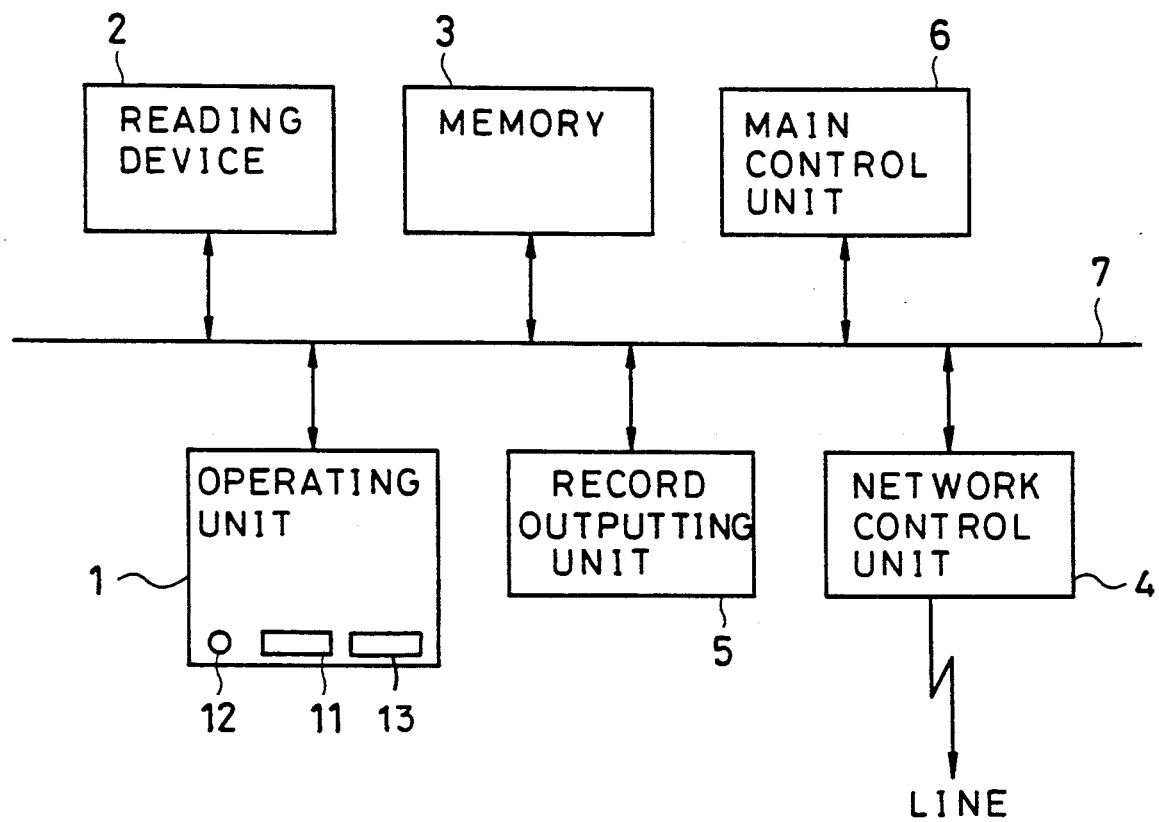
FIG. 2 is a block diagram showing an embodiment of the present invention.

In FIG. 2, an operating unit 1 having a keyboard, an original reading device 2, a memory 3 for storing required information, a network control unit 4 for controlling a transmit and receive to and from a facsimile receiver at a remote point, a record outputting unit 5 having a printer for outputting information as required and a main control unit 6 for controlling all the components are mutually connected through an appropriate interface by a data bus 7. A remote receiver calling key 11 and a warning lamp 12 formed of an LED are disposed side by side, or the latter may be incorporated into the former.

Figure 3:
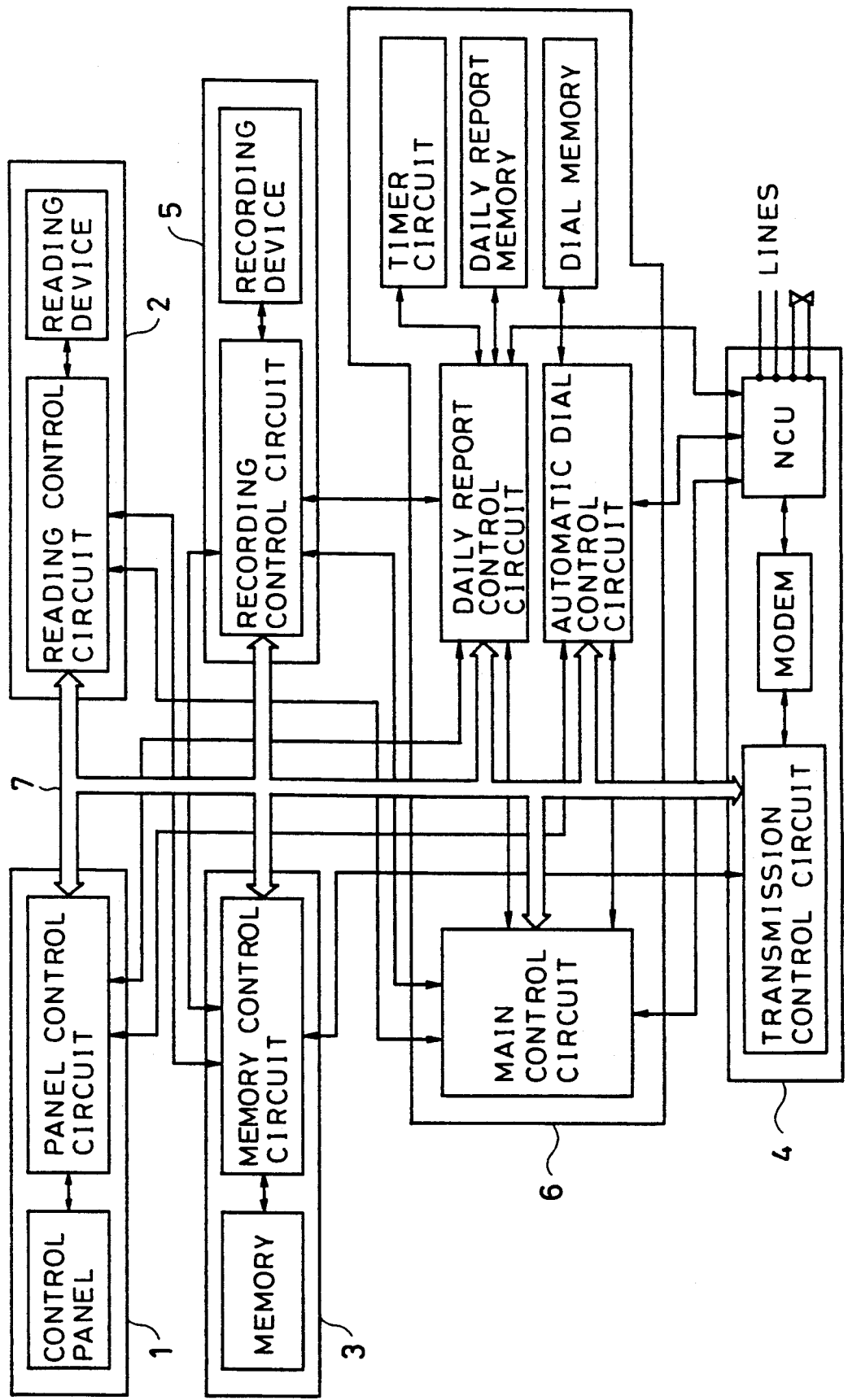
FIG. 3 is a block diagram showing an electric circuit according to the present invention.

FIG. 3 is a block diagram showing an electric circuit according to the present invention.

The control unit 1 is composed of a control panel having a keyboard (including ten keys) and a display device, and a panel control circuit for processing various information inputted from the control panel and displaying various information received from other circuits.

The reading device 2 is provided with an optical reading system (a light source, mirrors, lenses, photoelectric transfer elements, etc.) and is composed of a reading device for reading image information to be transmitted and a reading control circuit for controlling the reading device and processing the image information read by the reading device.

The memory 3 is composed of a memory for storing transmitted/received image information and a memory control circuit for reading/writing the image information.

The network control unit 4 is composed of an NCU connected to a public telephone line for switching between telephone and FAX, a modem for demodulating a facsimile signal received through the public telephone line and modulating image information to be transmitted into a facsimile signal, and a transmission control circuit for coding/decoding of the image information and controlling a communication mode.

The record outputting unit 5 is composed of a recording device for recording the received image information and a recording control circuit for controlling the recording device.

The main control unit 6 is composed of a main control circuit for entirely controlling the facsimile device, a daily report control circuit for managing daily reports on communication management information obtained by transmitting/receiving the image information, a timer circuit, a daily report memory connected to the daily report control circuit for storing the daily report management information, an automatic dial control circuit for controlling dial information inputted by the control unit and a dial memory for storing the dial information.

Now, the general operation of the facsimile device according to the present invention will be explained.

When an automatic transmission with time-designation is designated in the situation in which the call number impossible to be transmitted has not been stored yet and no response signal is received from the remote receiver;

(1) an automatic transmission with time-designation processing is selected by the control panel to input a time of the transmission and the call number of the remove receiver;

(2) the designated time of the transmission and the call number of the remote receiver are stored in the dial memory by the automatic dial control circuit;

(3) the daily report control circuit requests a transmission process to the main control circuit based upon information from the timer circuit;

(4) the main control circuit accordingly makes the automatic dial control circuit invoke the call number of the remote receiver from the dial memory and call the remote receiver;

(5) after the calling, the main control circuit judges whether or not a reference response signal is received from the remote receiver; and if not, it informs the automatic dial control circuit and the daily report control circuit that the called number of the remote receiver is a call number to which a facsimile transmission is unavaiable;

(6) the automatic control circuit has the dial memory storing the call number to which a facsimile transmission is unavailable, or the call number unready for facsimile transmission;

(7) the daily report control circuit has the daily memory storing the information on the time at which the facsimile transmission was unavailable and the information that no response has been received from the remote receiver, and prints the communication result through the recording device as required;

(8) thereafter, the line is turned off and a wait state starts.

Moreover, when the call number impossible to be transmitted has been stored and a time-designation and automatic transmission is set to that call number;

(1) an automatic-transmission with time-designation processing is selected by the control panel, and the transmission time and the call number of the remote receiver are inputted;

(2) the automatic dial control circuit judges whether or not the designated call number of the remote receiver has been stored in the dial memory as a call number impossible to be transmitted;

(3) if it has been stored, the automatic dial control circuit informs the daily report control circuit through the main control circuit that a call number impossible for facsimile transmission is designated (again);

(4) the daily report circuit accordingly instructs the recording control circuit to print the information that the designated call number of the remote receiver is impossible for facsimile transmission;

(5) the recording control circuit drives the recording device and prints the information that the designated call number of the remote receiver is a call number impossible for facsimile transmission; and (6) thereafter, the operator receiving the printing output corrects the call number to be designated.

The call number impossible to be transmitted which is stored in the dial memory can be cleared by operation of a clear key (not shown).

This embodiment is structured as stated above, and FIGS. 4 to 6(a) and 6(b) show the operation.

Figure 4:
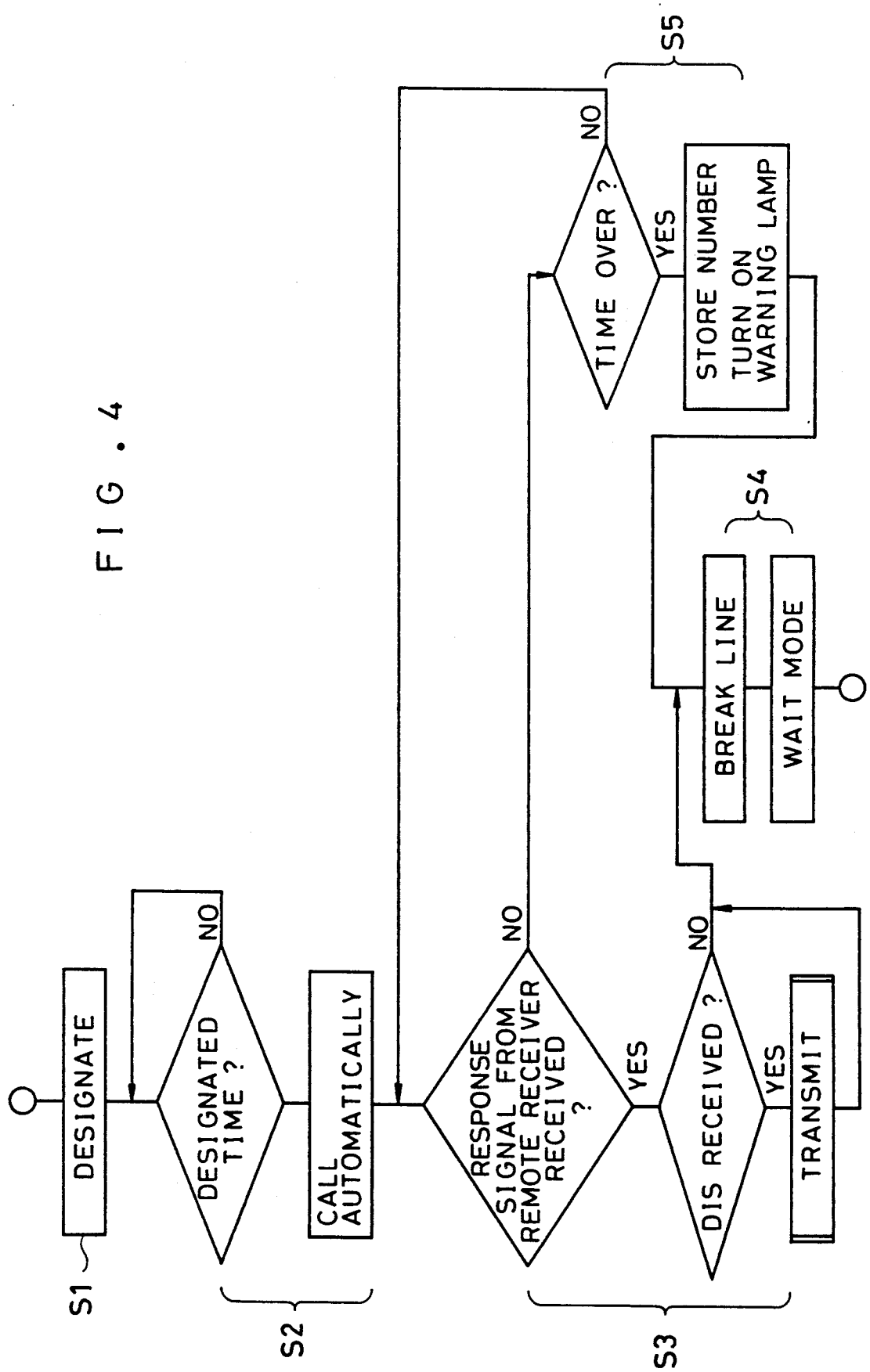

In FIG. 4, various keys of the control unit 1 are used to designate various things, for example, to designate a transmitting time and the call number of a remote facsimile receiver; and as required an original is set in the reading device 2, or otherwise the information to be transmitted in the memory 3 is designated (Step S1). At the designated time, the call number of the remote facsimile receiver is automatically called (Step S2), and when a reference response signal is received from the remote facsimile receiver and further a DIS signal is received, an ordinary transmission is performed (Step S3). Thus, the transmission is completed, or when the DIS signal is not received, a line is turned off and the device turns into a waiting mode (Step S4).

On the other hand, when the response signal cannot be received at Step S3, the process proceeds to Step S5. After a specified period of time, the warning lamp 12 lights up to inform the operator of impossibility of transmitting, and the call number is stored in a dial memory and the process proceeds to Step S4.

Figure 5:
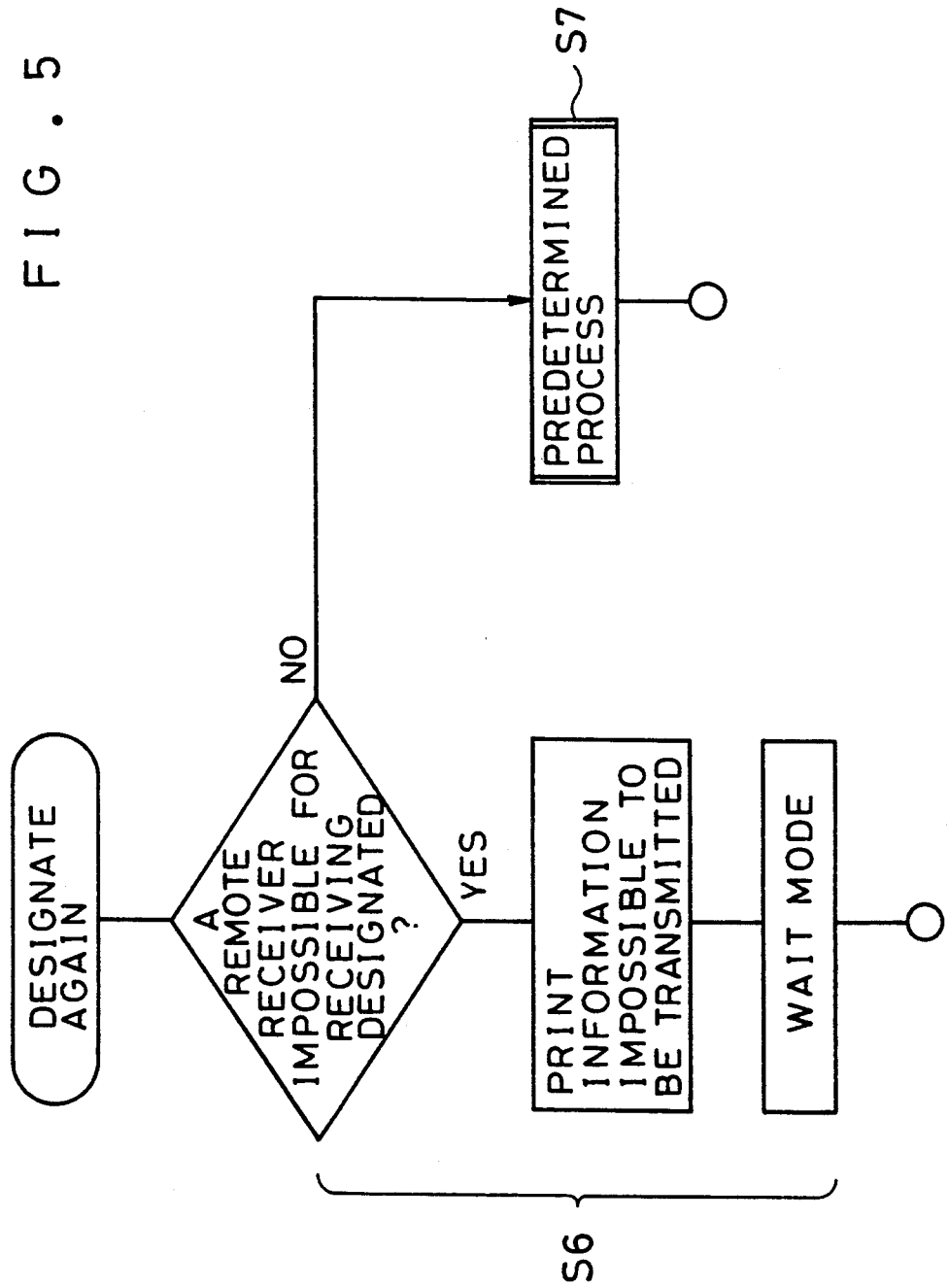
Figure 6:
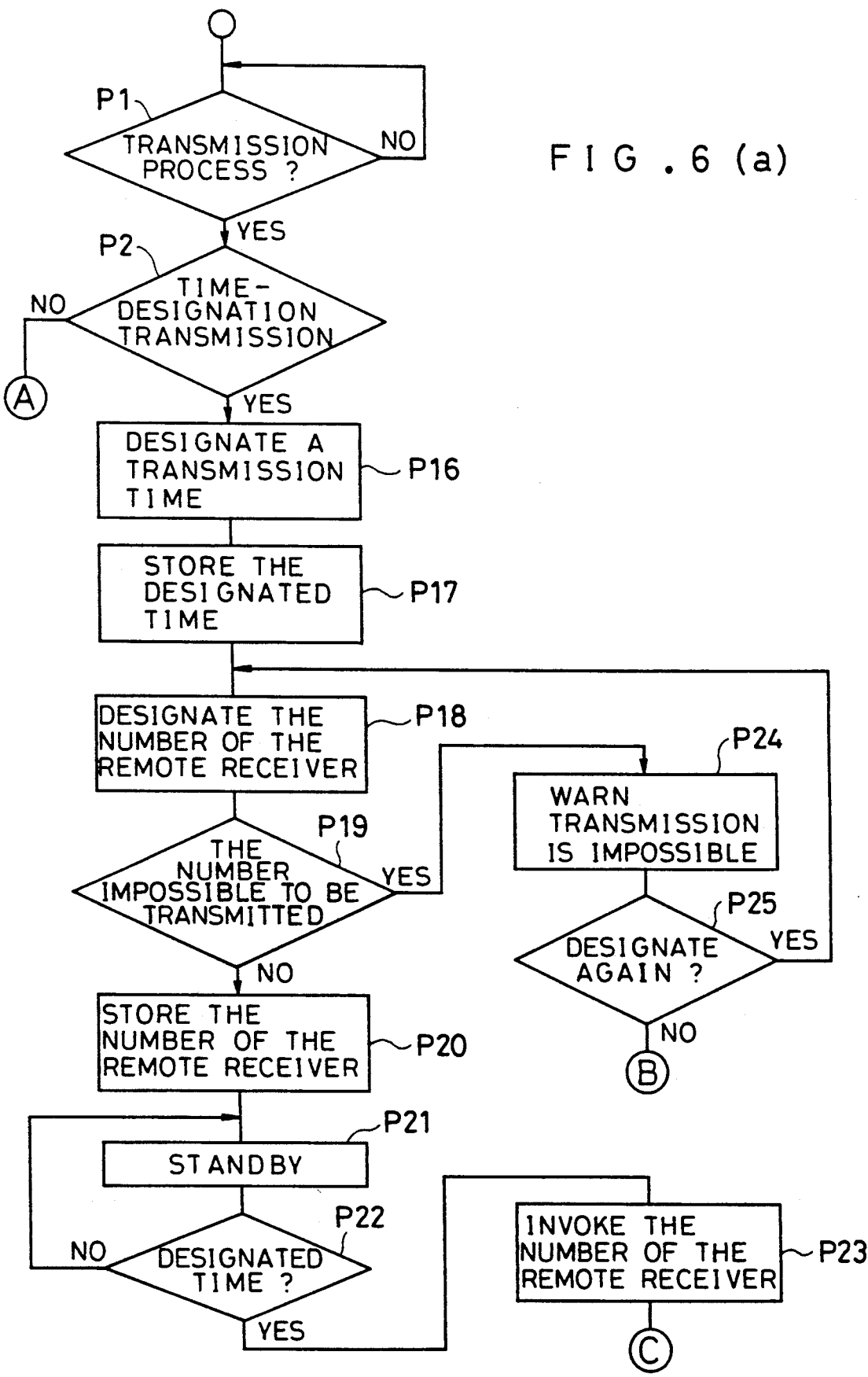
Figure 6:
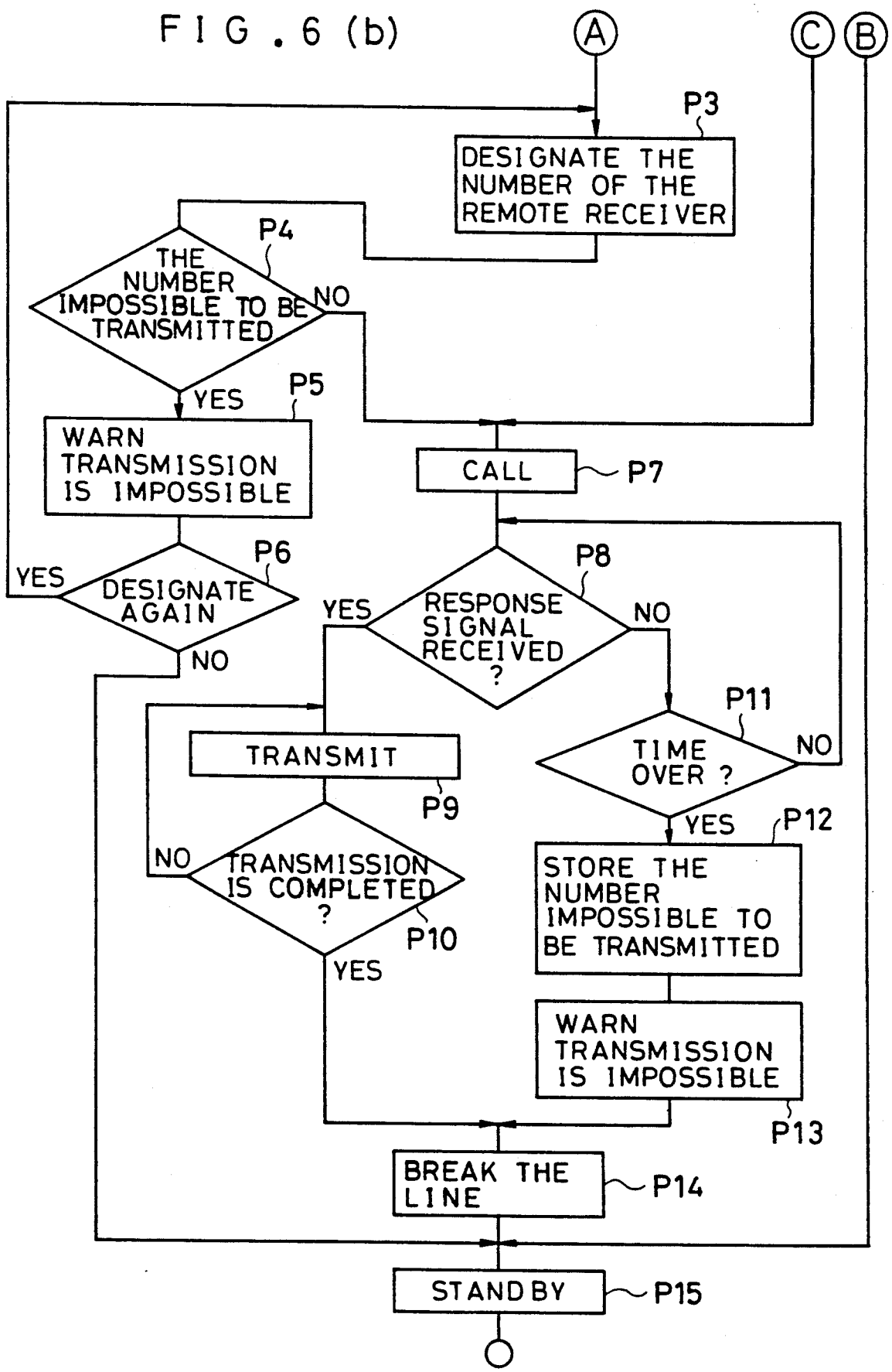

FIG. 5 shows the case of redesignation. When the same call number as that of the facsimile receiver from which a response signal has not been received at Step S3 is designated again, just after the designation, that is, before the transmission, the information which has not been able to be transmitted is printed out from the record outputting unit 5, and the device turns into a waiting mode (Step S6). The impossibility of transmitting means that the remote receiver is a facsimile and it has not been able to receive a response signal due to any problem on a line, that the remote receiver is a general subscriber telephone and therefore it has not been able to receive a response signal, or the like; and the information is printed out as an appropriate list. When the designated call number is not in accord with the call number impossible to be transmitted, the process proceeds to Step S7 and a predetermined procedure is continued.

Thus, lighting-up of the warning lamp 12 and printing-out can inform the operator of the call number of the remote receiver which was unready for receiving, and a redesignation of the same call number is prevented.

FIGS. 6(a) and 6(b) are flow charts showing the entire processing operation. In a transmission process (Step P1), when it is a time-designation transmission (Step P2), the designated transmission time is stored (Steps P16 and P17) and it is searched whether or not the designated call number of the remote receiver is a call number impossible to be transmitted (Step P18 and P19). If the call number is not impossible to be transmitted, the call number of the remote receiver is stored (Step P20), and the device turns to be on standby until the designated time (Steps P21 and P22), invokes the call number of the remote receiver at the designated time (Step P23) and call the call number (Step P7).

At Step P2, if it is not a time-designation transmission, it is searched whether or not the designated call number of the remote receiver is a call number impossible to be transmitted (Steps P3 and P4). If the call number is not impossible to be transmitted, the call number of the remote receiver is called (Step S7).

After the calling, if a response signal is received (Step P8), the transmission process is continued until the transmission is completed (Steps P9 and P10), the line is turned off (Step P14) and the device turns to be on standby (Step P15). If a response signal is not received, after a specified period of time (Step P11), the call number impossible to be transmitted is stored (Step P12), a visual alarm informs that the transmission is impossible by lightening up the display lamp 12 (Step P13), the line is turned off and the device turns to be on standby.

At Step 19, if the designated call number of the remote receiver is a call number impossible to be transmitted, the visual alarm informs that the transmission is impossible by printing the information which could not be transmitted (Step P24). If the operator can designate the call number of the remote receiver again (Step P25), Step P18 is repeated, but if not, the device turns to be on standby (Step P15). At step P4, similarly, a visual alarm informs that the transmission is impossible (Step P5). If the call number of the remote receiver can be designated again (Step P6), Step P18 is repeated, but if not, the device turns to be on standby (Step P15).

As will be apparent from the above-mentioned embodiment, the present invention provides a device which outputs a visual alarm to inform the operator of the impossibility of transmitting when the call number of a remote receiver from which a standard response signal has not been able to be received is designated again.

Thus, when the remote receiver is a general subscriber telephone, the visual alarm can inform the operator of the impossibility of transmitting, unlike the conventional embodiment which only presents the result of contact as a record list, whereby the mistake designating the same call number again can be assuredly prevented.

What is claimed is:

1. A facsimile device comprising:

designating means for designating a transmitting time of information and a call number of a remote receiver, transmitting means for calling the call number of said remote receiver at said designated transmitting time and receiving a reference response signal from said remote receiver when a line is connected thereto, for automatically transmitting the information to said remote receiver, judging means for judging, if a reference response signal is not received from said remote receiver although the line is connected thereto without receipt of a busy signal, that said remote receiver is a non-facsimile device;

storing means for storing the call number of a remote receiver when said remote receiver has been judged by said judging means to be a non-facsimile device, and warning means for outputting an alarm to inform impossibility of transmission when the call number of said remote receiver judged to be a non-facsimile device and stored in said storing means is redesignated by said designating means.

2. A device according to claim 1, wherein said designating means is composed of a control panel having a keyboard and a display device, and a panel control circuit for processing various information inputted from the control panel and displaying various information received from other circuits.

3. A device according to claim 1, wherein said storing means is composed of a daily report control circuit for managing daily reports on communication management information obtained by transmitting/receiving the image information, a timer circuit, a daily report memory connected to the daily report control circuit for storing the daily report management information, an automatic dial control circuit for controlling dial information including a transmission time and the call number of the remote receiver designated by said designating means and a dial memory for storing the dial information.

4. A device according to claim 1, wherein said warning means is composed of a recording device for recording received image information and printing the information that the designated call number of the remote receiver is a call number impossible to be transmitted and a recording control circuit for controlling said recording device.

5. A device according to claim 4, wherein said recording device prints the information that the designated call number of the remote receiver is impossible to be transmitted, just after the call number of the remote receiver from which a reference response signal could not be received is designated by said designating means.

6. A device according to claim 1, wherein the call number impossible to be transmitted which is stored in said storing means can be cleared by operation of a clear key.

7. A facsimile device comprising:

designating means for designating a transmitting time of information and a call number of a remote receiver;

transmitting means for calling the call number of said remote receiver at said designated transmitting time and receiving a reference response signal from said remote receiver when a line is connected thereto for automatically transmitting the information to said remote receiver;

storing means for storing the call number of a remote receiver when the line is connected to said remote receiver but a reference response signal is not issued from said remote receiver;

a recording device for recording received image information and printing the information that it is impossible to transmit to the designated call number of the remote receiver designated by said designating means just after the call number of the remote receiver from which a reference response signal could not be received is designated by said designating means; and a recording control circuit for controlling said recording device.

* * * * *